United States Patent
Terakado et al.

(10) Patent No.: US 9,581,119 B2
(45) Date of Patent: Feb. 28, 2017

(54) AUXILIARY CHAMBER GAS SUPPLYING DEVICE FOR GAS ENGINE

(71) Applicant: MITSUBISHI HEAVY INDUSTRIES, LTD., Tokyo (JP)

(72) Inventors: Kiyoshi Terakado, Tokyo (JP); Yuta Furukawa, Tokyo (JP); Hiroshi Yoshizumi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/360,882

(22) PCT Filed: Nov. 19, 2012

(86) PCT No.: PCT/JP2012/079975
§ 371 (c)(1),
(2) Date: May 27, 2014

(87) PCT Pub. No.: WO2013/080829
PCT Pub. Date: Jun. 6, 2013

(65) Prior Publication Data
US 2015/0028239 A1  Jan. 29, 2015

(30) Foreign Application Priority Data
Nov. 30, 2011  (JP) .................. 2011-261846

(51) Int. Cl.
*F02B 23/08*  (2006.01)
*F02M 61/04*  (2006.01)
(Continued)

(52) U.S. Cl.
CPC ......... *F02M 61/042* (2013.01); *F02B 19/108* (2013.01); *F02B 19/12* (2013.01);
(Continued)

(58) Field of Classification Search
CPC ........ F02B 23/08; F02B 2275/22; F02B 1/04; F02B 2275/34; F02F 2001/245
(Continued)

(56) References Cited

U.S. PATENT DOCUMENTS

| 4,546,740 A | * | 10/1985 | Clements et al. | ............ 123/304 |
| 6,994,308 B1 | * | 2/2006 | Wang | .................... F16K 31/408 |
| | | | | 251/129.21 |
| 2008/0196690 A1 | * | 8/2008 | Hotta | .................... F02B 17/005 |
| | | | | 123/274 |

FOREIGN PATENT DOCUMENTS

| CA | 489330 | * | 6/1953 |
| CN | 2908805 Y | | 6/2007 |

(Continued)

OTHER PUBLICATIONS

International Preliminary Report on Patentability and Written Opinon of the International Searching Authority (Form PCT/IB/326, PCT/IB/373, PCT/IB/338 and PCT/ISA/237) and English translation thereof, dated Jun. 12, 2014, for International Application No. PCT/JP2012/079975.
(Continued)

*Primary Examiner* — Lindsay Low
*Assistant Examiner* — Charles Brauch
(74) *Attorney, Agent, or Firm* — Birch, Stewart, Kolasch & Birch, LLP

(57) ABSTRACT

In an auxiliary chamber gas supplying device for a gas engine including an auxiliary chamber gas supply path (5, 14, 28, and 29) through which fuel gas is supplied to an auxiliary chamber (4), the auxiliary chamber gas supply path is connected to a fuel gas supply source (24) through a solenoid valve (23), and when the solenoid valve is opened, the fuel gas, in an amount corresponding to an opened period of the solenoid valve, is supplied from the fuel gas supply source to the auxiliary chamber through the auxiliary cham- (Continued)

ber gas supply path, and the opened period of the solenoid valve is set in such a manner that a predetermined amount of fuel gas is supplied to the auxiliary chamber, and a restriction unit (30) that extends the opened period of the solenoid valve is formed in the auxiliary chamber gas supply path (5, 14, 28, and 29).

5 Claims, 6 Drawing Sheets

(51) Int. Cl.

| | | |
|---|---|---|
| *F02B 19/12* | (2006.01) | |
| *F02M 21/02* | (2006.01) | |
| *F02B 19/10* | (2006.01) | |
| *F02D 19/02* | (2006.01) | |
| *F16K 31/06* | (2006.01) | |
| *F02F 1/24* | (2006.01) | |
| *F02B 1/04* | (2006.01) | |

(52) U.S. Cl.
CPC ....... *F02D 19/024* (2013.01); *F02M 21/0239* (2013.01); *F02M 21/0269* (2013.01); *F02M 21/0275* (2013.01); *F16K 31/06* (2013.01); *F02B 1/04* (2013.01); *F02B 23/08* (2013.01); *F02B 2275/22* (2013.01); *F02B 2275/34* (2013.01); *F02F 2001/245* (2013.01); *Y02T 10/125* (2013.01); *Y02T 10/32* (2013.01)

(58) Field of Classification Search
USPC .......................................................... 123/657
See application file for complete search history.

(56) References Cited

FOREIGN PATENT DOCUMENTS

| | | | |
|---|---|---|---|
| JP | 5-24922 | U | 4/1993 |
| JP | 8-240152 | A | 9/1996 |
| JP | 9-14057 | A | 1/1997 |
| JP | 2000-320369 | A | 11/2000 |
| JP | 2004-36424 | A | 2/2004 |
| JP | 2007-205236 | A | 8/2007 |
| JP | 2008-248850 | A | 10/2008 |
| JP | 2009-221935 | A | 10/2009 |
| JP | 2010-150983 | A | 7/2010 |
| JP | 2010-265835 | A | 11/2010 |
| JP | 2011149308 | A | 8/2011 |

OTHER PUBLICATIONS

Japanese language International Search Report (Forms PCT/ISA/220 and PCT/ISA/210), dated Jan. 29, 2013, for International Application No. PCT/JP2012/079975.
Japanese Notice of Allowance and English translation thereof, dated May 16, 2014, for Japanese Application No. 2011-261846.
Korean Office Action dated Apr. 29, 2015, for Korean Application No. 10-2014-7013284 with the English translation.
Extended European Search Report for European Application No. 12854267.7, dated Jul. 6, 2015.
Chinese Office Action mailed Dec. 22, 2015 issued in corresponding Chinese Application No. 201280057286.6 with an English translation.
Chinese Notice of Allowance dated Aug. 1, 2016, for Chinese Application No. 201280057286.6 with the English translation.

* cited by examiner

AUXILIARY CHAMBER GAS SUPPLYING DEVICE FOR GAS ENGINE

TECHNICAL FIELD

The present invention relates to an auxiliary chamber gas supplying device for a gas engine, applied to a gas engine including an auxiliary chamber, and configured in such a manner that, when a solenoid valve is opened so that fuel gas is supplied to an auxiliary chamber, an amount of fuel gas supplied to the auxiliary chamber is adjusted with an opened period of the solenoid valve.

BACKGROUND ART

Gas engines generally include, as a combustion chamber, an auxiliary chamber, in addition to a main chamber. In the auxiliary chamber, an air-fuel mixture is ignited to produce a torch flame. The torch flame is injected to the main chamber to burn the air-fuel mixture in the main chamber. The air-fuel mixture supplied to the auxiliary chamber is richer than that supplied to the main chamber. The fuel gas is supplied to the auxiliary chamber through a supply path different from that for the main chamber. General configurations of such a gas engine are disclosed in Patent Documents 1 and 2, for example.

FIG. 5 is a diagram showing the relationship between an opening/closing timing of a feed/exhaust valve and the pressure in a cylinder, in the gas engine. In FIG. 5, main chamber solenoid valve open means that a main chamber solenoid valve for opening and closing a main chamber gas supply path, connecting between a fuel supply source and the main chamber, is opened. Similarly, auxiliary chamber solenoid valve open means that an auxiliary chamber solenoid valve for opening and closing an auxiliary chamber gas supply path, connecting between the fuel supply source and the auxiliary chamber, is opened.

As shown in FIG. 5, the period, during which the fuel gas can be supplied to the main chamber and the auxiliary chamber, is limited to a short period such as during an intake step, in which the pressure in the cylinder is low. The amount of fuel gas supplied to the auxiliary chamber is adjusted within the short period of time during which the auxiliary chamber solenoid valve is opened.

Patent Document 1: Japanese Patent Application Laid-open No. 2010-150983

Patent Document 2: Japanese Patent Application Laid-open No. 2010-265835

DISCLOSURE OF THE INVENTION

The solenoid valves have individual differences and thus inherently vary in the valve opening/closing speed, and thus vary in the time required for completing the opening/closing operation. The dispersion in the time required for completing the opening/closing operation leads to the dispersion in the supplied amount of fuel gas. For example, as shown in FIG. 6, in the case of a solenoid valve (FIG. 6b) with a valve opening speed (fast), relative to a solenoid valve (FIG. 6a) with a valve opening speed (standard), a faster valve opening speed causes a larger excess of the supplied fuel gas. In the case of a solenoid valve (FIG. 6b) with a valve opening speed (slow), a slower valve opening speed causes a larger shortage of the supplied fuel gas.

The problem, caused by the dispersion of the fuel gas supplied amount due to the individual difference of the solenoid valve described above, is particularly eminent when the fuel gas is supplied to the auxiliary chamber. Specifically, the auxiliary chamber has a smaller volume than the main chamber, and thus the opened period of the solenoid valve is simply shorter. Thus, the dispersion of the valve opening/closing speed largely affects the dispersion of the supplied amount of the fuels gas. The dispersion of the fuel gas supplied amount, specifically, the fuel gas supplied amount smaller than the standard amount for example, might lead to unstable combustion. On the other hand, the fuel gas supplied amount larger than the standard amount might degrade the fuel efficiency. The dispersion of the combustion gas supplied amount among a plurality of cylinders might degrade the performance of an engine as a whole.

The present invention is an invention made in view of such problems of the conventional technique. An object of the present invention is to provide an auxiliary chamber gas supplying device for a gas engine, for supplying fuel gas to an auxiliary chamber, in which the dispersion of the amount of the fuel supplied to the auxiliary chamber due to the individual difference of the solenoid valve can be suppressed, so that stable combustion of the gas engine and the improvement of the engine performance can be achieved.

The present invention is made to solve the above described problems in the conventional technique and achieve the goal.

In an auxiliary chamber gas supplying device for a gas engine including a main chamber defined between a piston and a cylinder head, an auxiliary chamber in communication with the main chamber through an injection hole, and an auxiliary chamber gas supply path through which fuel gas is supplied to the auxiliary chamber, the auxiliary chamber gas supply path is connected to a fuel gas supply source through a solenoid valve, and when the solenoid valve is opened, the fuel gas, in an amount corresponding to an opened period of the solenoid valve, is supplied from the fuel gas supply source to the auxiliary chamber through the auxiliary chamber gas supply path, and the opened period of the solenoid valve is set in such a manner that a predetermined amount of fuel gas is supplied to the auxiliary chamber, and a restriction unit that extends the opened period of the solenoid valve is formed in the auxiliary chamber gas supply path.

As described above, in the present invention, the opened period of the auxiliary chamber solenoid valve is so set that a predetermined amount of fuel gas is supplied to the auxiliary chamber. The restriction unit for extending the opened period of the auxiliary chamber solenoid valve is formed in the auxiliary chamber gas supply path. Specifically, the opened period of the auxiliary chamber solenoid valve is extended in accordance with the amount of the fuel gas supplied per unit time reduced by the restriction unit. Thus, in the present invention, the opened period of the auxiliary chamber solenoid valve is longer than that in a conventional auxiliary chamber gas supplying device for a gas engine, in which the restriction unit is not formed. Thus, the dispersion of the supplied amount of fuel gas due to the dispersion of the opening/closing speed of the auxiliary chamber solenoid valve 23 can be suppressed, so that stable combustion of the gas engine and the improvement of the engine performance can be achieved.

In the present invention, the restriction unit is preferably an orifice formed in the auxiliary chamber gas supply path.

With such a configuration, the restriction unit can be formed in the auxiliary chamber gas supply path with a simple configuration. Such a restriction unit formed of the orifice can be easily formed, in an existing auxiliary chamber gas supply device for a gas engine, as an optional part. Thus, the restriction unit can be formed without largely changing the configuration of the existing auxiliary chamber gas supplying device for a gas engine.

In the present invention, the restriction unit preferably includes a check valve disposed in the auxiliary chamber gas supply path, and a flow coefficient of the check valve is preferably in a range between 0.05 and 0.3.

By thus disposing the check valve, having the flow coefficient in the range between 0.05 and 0.3, in the auxiliary chamber gas supply path, the check valve formed in the auxiliary chamber gas supply path can be formed as the restriction unit. As described above, the restriction unit reduces the supplied amount of the fuel gas per unit time to extend the opened period of the solenoid valve. Thus, the restriction unit of the present invention does not include a check valve (with the flow coefficient not smaller than 0.3) with a large flow coefficient.

The present invention can provide an auxiliary chamber gas supplying device for a gas engine for supplying fuel gas to an auxiliary chamber, in which the dispersion of the supplied amount of the fuel gas to the auxiliary chamber due to the individual difference of a solenoid valve can be suppressed, and thus the stable combustion of the gas engine and the improvement of the engine performance can be achieved.

BEST MODE FOR CARRYING OUT THE INVENTION

Embodiments of the present invention will be described below in detail based on the drawings.

The scope of the present invention is not limited to the embodiments described below. The sizes, materials, shapes, and relative positioning of components described in the embodiments below are merely examples for description, and there is no intension to limit the scope of the present invention thereto unless otherwise noted.

First Embodiment

Figure 1:
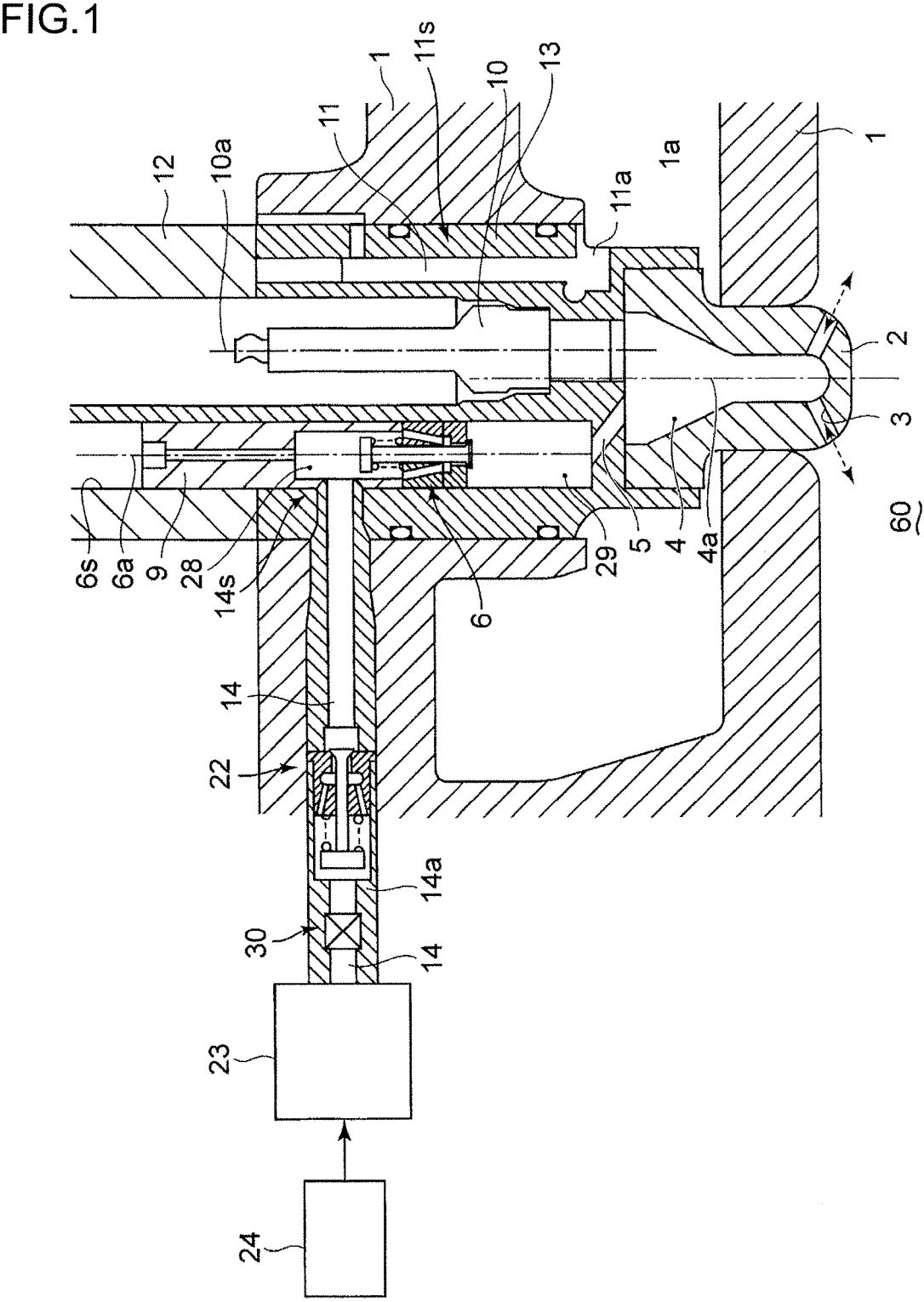
FIG. 1 is a cross-sectional view of a portion around an auxiliary chamber of a gas engine including an auxiliary chamber gas supplying device of a first embodiment.

FIG. 1 is a cross-sectional view of a portion around an auxiliary chamber of a gas engine including an auxiliary gas supplying unit of a first embodiment. First of all, the overall configuration of the auxiliary chamber gas supplying device of the first embodiment is described by referring to FIG. 1.

In FIG. 1, a main chamber 60 as a main combustion chamber is defined between a piston (not illustrated) and a cylinder head 1. An auxiliary chamber cap 2 is fixed in an upper portion of the cylinder head 1 and is surrounded by a water chamber 1a. An auxiliary chamber 4 is formed in the auxiliary chamber cap 2 (4a denotes the center of the auxiliary chamber 4). The auxiliary chamber 4 is in communication with the main chamber 60 through an injection hole 3. The auxiliary chamber cap 2 has an auxiliary chamber upper surface, in the upper portion, pressed by an ignition plug presser 13 and a pressing attachment 12, and thus is fixed to the cylinder head 1. An ignition plug 10 is fixed in the ignition plug presser 13 via an attachment sheet.

As shown in FIG. 1, in the ignition plug presser 13, a bore cool hole 11s and a check vale insertion hole 6s are formed around the auxiliary chamber 4. In the bore cool hole 11s, a bore cool lateral hole 11a (inlet hole) on the lower side is in communication with a bore cool lateral hole (outlet hole) on the upper side, through a plurality of bore cool vertical holes (vertical cooling holes) 11 parallel to an axial center line 10a of the ignition plug 10. The bore cool hole 11s is formed to surround a high temperature portion of the ignition plug 10. The check valve insertion hole 6s is disposed to have a center 6a thereof in parallel with the center 10a of the ignition plug 10. A first check valve 6, supported by a check valve holder 9, is disposed in a lower portion of the check valve insertion hole 6s. With the first check valve 6 disposed, two spaces of a check valve upper chamber 28 and a check valve lower chamber 29 are defined in the check valve insertion hole 6s. The check valve lower chamber 29 is in communication with the auxiliary chamber 4 through a communication hole 5.

One end of a fuel inlet connector 14a is connected to a side portion of the ignition plug presser 13. Thus, a fuel inlet path 14 formed in the fuel inlet connector 14a is in communication with the check valve upper chamber 28. The fuel inlet connector 14a is formed separately from the ignition plug presser 13, screwed into the ignition plug presser 13, and fixed to the fuel gas inlet portion 14s.

The other end of the fuel gas inlet connector 14a is connected to a fuel gas supply source 24 through an auxiliary chamber solenoid valve 23. The fuel gas supply source 24 discharges fuel gas to the fuel inlet path 14 at a substantially constant pressure. In this embodiment, the discharge pressure is 0.08 to 0.09 Mpa in gauge pressure. In the fuel inlet connector 14a, a second check valve 22 is disposed between the auxiliary chamber solenoid valve 23 and the fuel gas inlet portion 14s. The second check valve 22 and the first check valve 6 described above both only permit the flow from the fuel gas supply source 24 to the auxiliary chamber 4, and thus prevents the back flow of the fuel gas from the auxiliary chamber 4 to thus prevent accumulation of soot and the like in the fuel inlet path 14.

In the auxiliary chamber solenoid valve 23, a valve body, constantly biased in a valve closing direction by a spring and the like, is operated in a valve opening direction against the spring force, when a solenoid portion is energized and thus excited. When the energizing is terminated, the valve body is operated in the valve closing direction by the spring force. Inputting of an opening/closing signal to the auxiliary chamber solenoid valve 23, that is, ON/OFF of the energizing is controlled based on a signal from a clank angle sensor, not shown.

Figure 2:
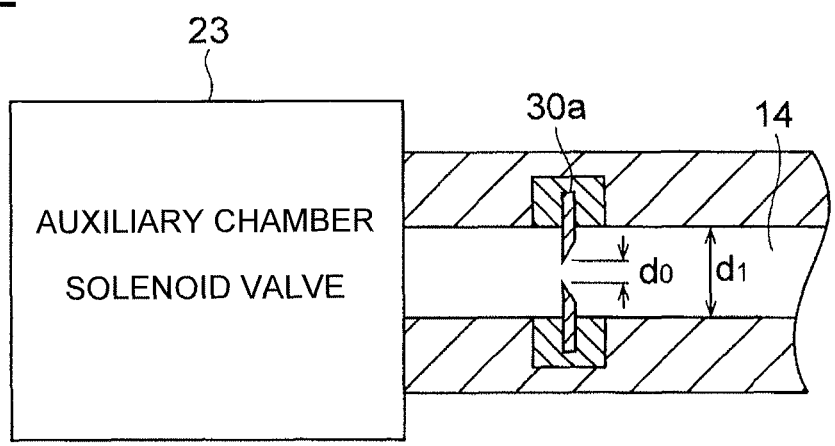
FIG. 2 is a diagram showing a restriction unit of the first embodiment.

As shown in FIG. 1, in this embodiment, a restriction unit 30 is formed between the auxiliary chamber solenoid valve 23 and the second check valve 22. The restriction unit 30 of this embodiment includes an orifice 30a as shown in FIG. 2. An orifice diameter $d_0$ of the orifice 30a, which slightly varies in accordance with the hole diameter and length of the fuel inlet path 14 as well as the supply pressure of the fuel gas from the fuel gas supply source, is preferably in the range between ⅕ and ⅑ with respect to a tube diameter $d_1$ of the fuel inlet path 14. In this embodiment, the orifice diameter $d_0$ is 1 mm with respect to the tube diameter $d_1$ (7 mm) of the fuel inlet path 14, and thus $d_0=\frac{1}{7}d_1$. The extension of the fuel inlet path 14 is approximately 300 mm, in this embodiment.

In the auxiliary chamber gas supplying device for a gas engine of this embodiment having the configuration described above, when the valve open signal is input to the auxiliary chamber solenoid valve 23, connected to the fuel gas supply source 24, the solenoid portion is energized so that the valve body is moved to be opened, whereby the fuel gas flows out from the fuel gas supply source 24 toward the fuel inlet path 14. The fuel gas thus flowed out flows into the check valve upper chamber 28 through the fuel gas inlet portion 14s, and flows into the auxiliary chamber 4 from the check valve lower chamber 29 through the communication hole 5. Thus, the auxiliary chamber gas supply path of the present invention, through which the fuel gas is supplied to the auxiliary chamber 4, is formed of the fuel inlet path 14, the check valve upper chamber 28, the check valve lower chamber 29, and the communication hole 5 that are described above.

The standard amount of fuel gas to be supplied to the auxiliary chamber 4 is calculated from the volume of the auxiliary chamber 4, the air-fuel mixture concentration in the main chamber 60, and the like. In this embodiment, the amount of the fuel gas supplied to the auxiliary chamber 4 is adjusted with the period, during which the auxiliary chamber solenoid valve 23 is opened. In the auxiliary chamber gas supplying device for a gas engine of this embodiment, the orifice 30a described above is formed to reduce the amount of fuel gas that flows into the auxiliary chamber 4 per unit time. Thus, the opened period of the auxiliary chamber solenoid valve 23 can be set to be longer.

Figure 3A:
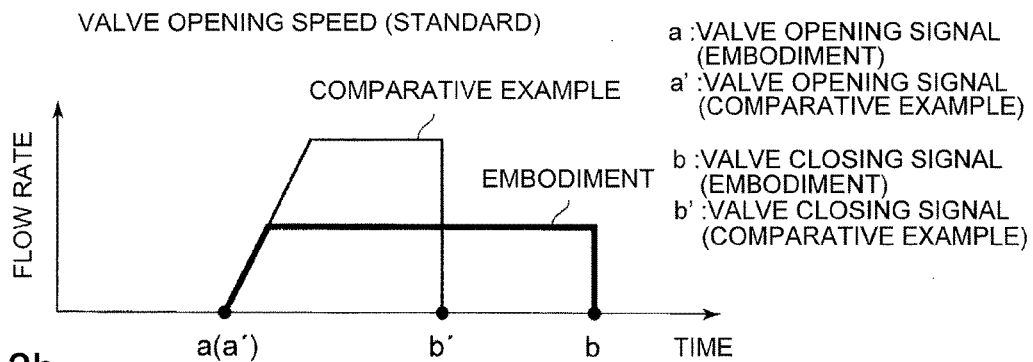
FIG. 3a is a diagram for describing an effect of setting a longer opened period of an auxiliary chamber solenoid valve.

The auxiliary chamber solenoid valves 23 have individual differences and thus inherently vary in the valve opening/closing speed, and thus vary in the period of time required for the opening/closing operation to be completed. As described above, the dispersion in the period of time required for the opening/closing operation to be completed leads to the dispersion in the fuel gas supplied amount. By setting the opened period of the solenoid valve to be longer as in this embodiment, the dispersion of the supplied amount of the fuel gas can be made relatively small as shown in FIG. 3.

Figure 3B:
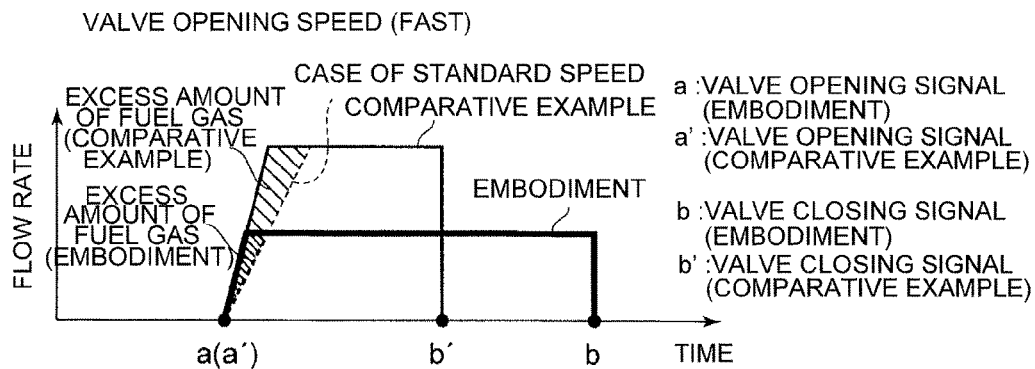
FIG. 3b is a diagram for describing an effect of setting a longer opened period of an auxiliary chamber solenoid valve.
Figure 3C:
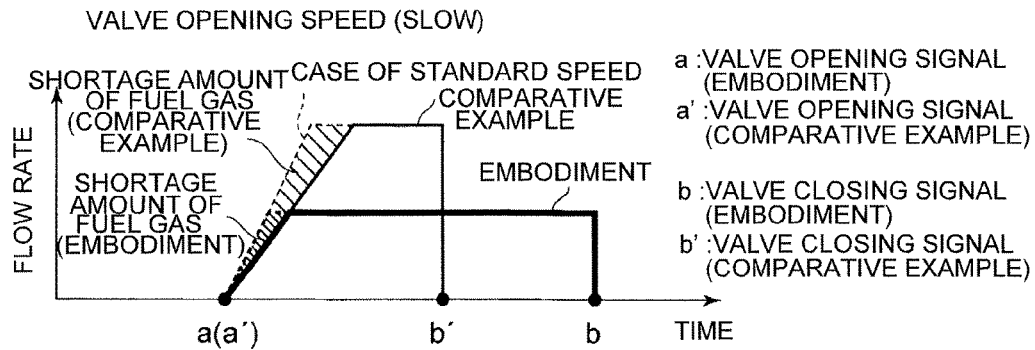
FIG. 3c is a diagram for describing an effect of setting a longer opened period of an auxiliary chamber solenoid valve.

Specifically, in an embodiment where the valve opening speed is faster than the standard speed and the opened period of the solenoid valve is long, as shown in FIG. 3b, the amount of fuel gas that flow per unit time is small. Thus, compared with a comparative example where the opened period of the solenoid valve is short, the excess amount of fuel gas due to the dispersion of the valve opening speed is small. In an embodiment where the valve opening speed is slower than the standard speed and the opened period of the solenoid valve is long, as shown in FIG. 3c, the amount of fuel gas that flow per unit time is small. Thus, compared with the comparative example where the opened period of the solenoid valve is short, the shortage amount of fuel gas due to the dispersion of the valve opening speed is small.

As described above, in this embodiment, the opened period of the auxiliary chamber solenoid valve 23 is so set that a predetermined amount of fuel gas is supplied to the auxiliary chamber 4. The restriction unit 30 for extending the opened period of the auxiliary chamber solenoid valve 23 is formed in the auxiliary chamber gas supply path. Specifically, the opened period of the auxiliary chamber solenoid valve is extended in accordance with the amount of the fuel gas supplied per unit time reduced by the restriction unit 30. Thus, in this embodiment, the opened period of the auxiliary chamber solenoid valve 23 is longer than that in a conventional auxiliary chamber gas supplying device for a gas engine, in which the restriction unit 30 is not formed. Thus, the dispersion of the supplied amount of fuel gas due to the dispersion of the opening/closing speed of the auxiliary chamber solenoid valve 23 is suppressed, whereby stable combustion of the gas engine and the improvement of the engine performance can be achieved.

In this embodiment, the restriction unit 30 is the orifice 30a formed in the auxiliary chamber gas supply path. With such a configuration, in this embodiment, the restriction unit can be formed in the auxiliary chamber gas supply path with a simple configuration. Such a restriction unit formed of the orifice 30a can be easily formed, in an existing auxiliary chamber gas supplying device for a gas engine, as an optional part. Thus, the restriction unit can be formed without largely changing the configuration of the existing auxiliary chamber gas supplying device for a gas engine.

Second Embodiment

Figure 4:
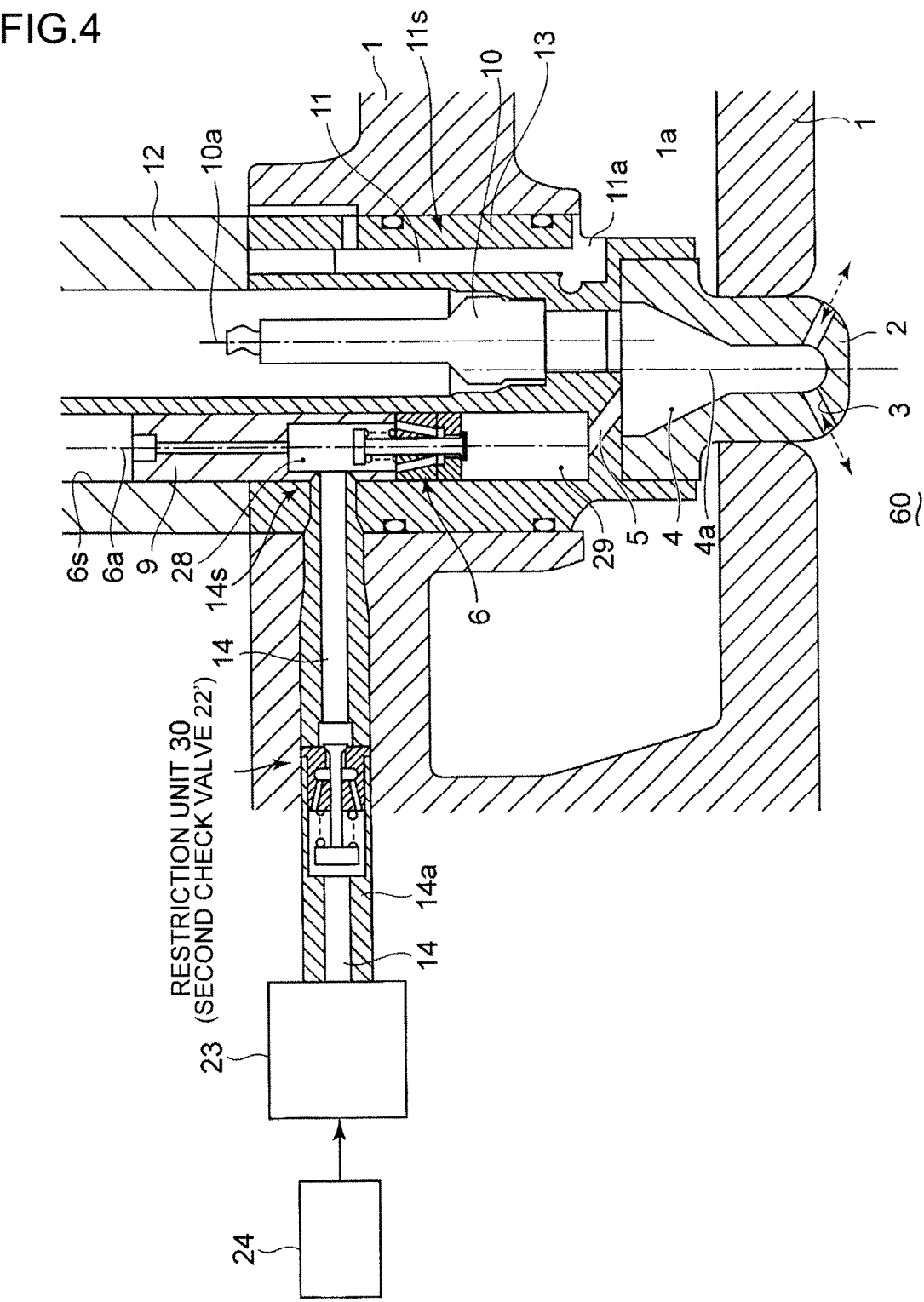
FIG. 4 is a cross-sectional view of a portion around an auxiliary chamber of a gas engine including an auxiliary chamber gas supplying device of a second embodiment.
Figure 5:
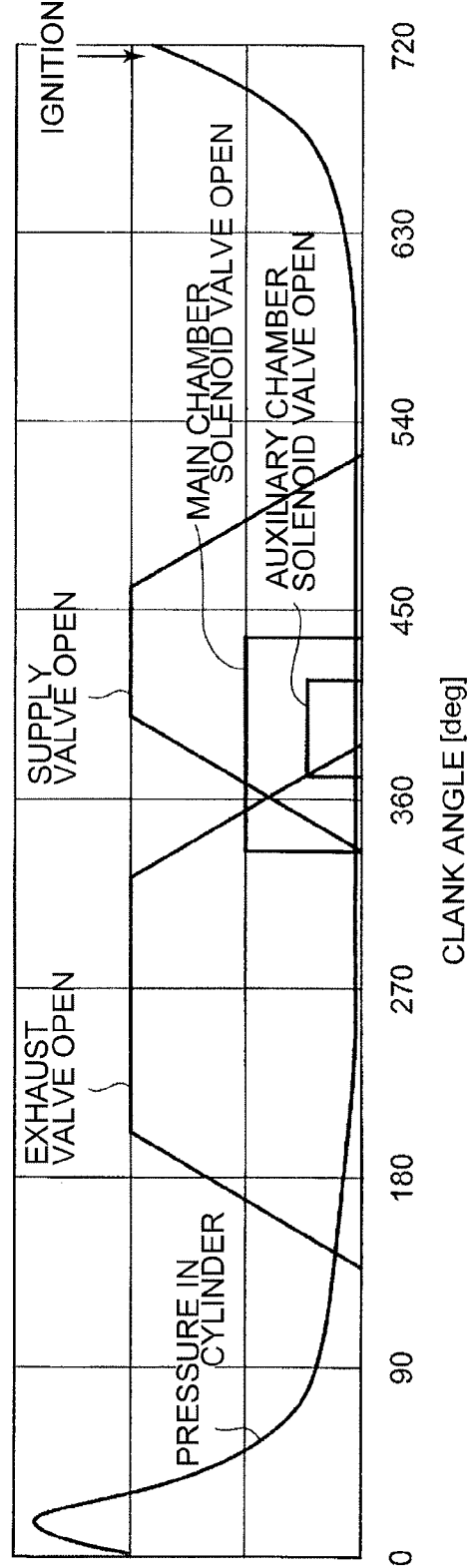
FIG. 5 is a diagram showing the relationship between an opening/closing timing of a supply/exhaust valve and a pressure in a cylinder, in the gas engine.
Figure 6A:
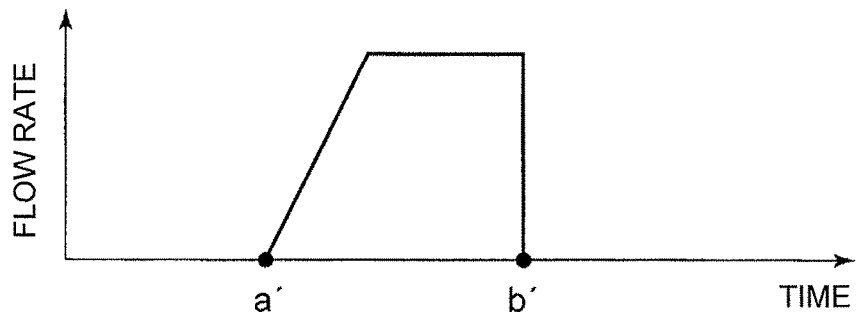
FIG. 6a is a diagram for describing the relationship between a valve opening speed of the auxiliary chamber solenoid valve and a supplied amount of fuel gas.
Figure 6B:
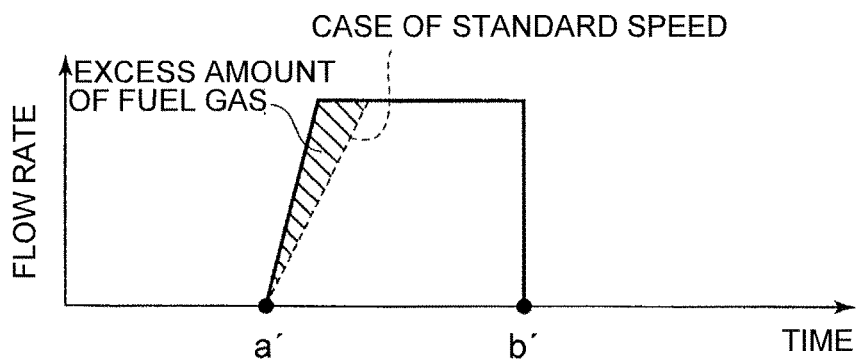
FIG. 6b is a diagram for describing the relationship between a valve opening speed of the auxiliary chamber solenoid valve and a supplied amount of fuel gas.
Figure 6C:
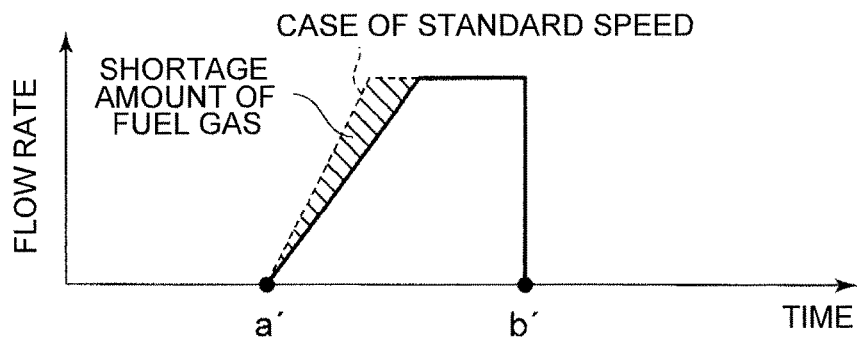
FIG. 6c is a diagram for describing the relationship between a valve opening speed of the auxiliary chamber solenoid valve and a supplied amount of fuel gas.

Next, a second embodiment of the present invention will be described based on FIG. 4. FIG. 4 is a cross-sectional view of a portion around an auxiliary chamber in a gas engine including an auxiliary chamber gas supplying device of the second embodiment. The second embodiment has basically the same configuration as the first embodiment described above, and the same components are denoted with the same reference numerals and will not be described in detail.

The auxiliary chamber gas supplying device for a gas engine according to the second embodiment is different from the first embodiment described above in that the restriction unit formed of the orifice 30a is not formed and instead, a second check valve 22' is formed as the restriction unit 30.

The flow coefficient (Cv) of the second check valve 22' according to the second embodiment is in the range between 0.05 and 0.3, and thus is smaller than that of the check valve (flow coefficient: 0.3 to 0.9) used in a general auxiliary chamber gas supplying device for a gas engine. Thus, the second check valve 22' also serves as the restriction unit 30 that reduces the pressure of the fuel gas.

The flow coefficient (Cv) of a valve is defined as in the following Formula (1):

$$Cv = Q \times \sqrt{(G/\Delta P/2)}/A \qquad (1)$$

(where, Q is a flow rate, G is the specific weight of a fluid, ΔP is differential pressure before and after the valve, and A is a cross-sectional area).

In the second embodiment described above, the restriction unit 30 is formed as in the first embodiment described above. Thus, the opened period of the auxiliary chamber solenoid valve 23 is extended. Thus, the dispersion of the supplied amount of fuel gas due to the dispersion of the opening/closing speed of the auxiliary chamber solenoid valve 23 is suppressed, whereby the stable combustion of the gas engine and the improvement of the engine performance can be achieved.

The check valve, having the flow coefficient in the range between 0.05 and 0.3, is disposed in the auxiliary chamber gas supply path, as the second check valve 22'. Thus, the second check valve 22' can be formed as the restriction unit 30.

The preferred embodiments of the present invention are described above. However, the present invention is not limited to the embodiments described above and can be modified in various ways without departing from the object of the present invention.

INDUSTRIAL APPLICABILITY

The present invention can be favorably used as an auxiliary chamber gas supplying device for a gas engine including an auxiliary chamber.

The invention claimed is:

1. An auxiliary chamber gas supplying device for a gas engine comprising:
   a main chamber defined between a piston and a cylinder head;
   an auxiliary chamber in communication with the main chamber through an injection hole;
   an auxiliary chamber gas supply path through which fuel gas is configured to be supplied to the auxiliary chamber; and
   an ignition plug disposed to face the auxiliary chamber, wherein
   the auxiliary chamber gas supply path is connected to a fuel gas supply source through a solenoid valve, and when the solenoid valve is opened, the fuel gas, in an amount corresponding to an opened period of the solenoid valve, is configured to be supplied from the fuel gas supply source to the auxiliary chamber through the auxiliary chamber gas supply path and the fuel gas supplied to the auxiliary chamber is configured to be ignited by the ignition plug, and
   a restriction unit is formed in the auxiliary chamber gas supply path, and an amount of fuel gas supplied to the auxiliary chamber per unit time is configured to be reduced by setting the opened period of the solenoid valve required for supplying a predetermined amount of fuel gas to the auxiliary chamber to be longer than in a case where the restriction unit is not formed in the auxiliary chamber gas supply path,
   wherein the restriction unit is a check valve disposed in the auxiliary chamber gas supply path, and a flow coefficient of the check valve is in a range between 0.05 and 0.3.

2. An auxiliary chamber gas supply device for the gas engine, comprising:
   a main chamber defined between a piston and a cylinder head;
   an auxiliary chamber in communication with the main chamber through an injection hole;
   an auxiliary chamber gas supply path through which fuel gas is configured to be supplied to the auxiliary chamber; and
   an ignition plug disposed to face the auxiliary chamber, wherein
   the auxiliary chamber gas supply path is connected to a fuel gas supply source through a solenoid valve, and when the solenoid valve is opened, the fuel gas, in an amount corresponding to an opened period of the solenoid valve, is configured to be supplied from the fuel gas supply source to the auxiliary chamber through the auxiliary chamber gas supply path and the fuel gas supplied to the auxiliary chamber is configured to be ignited by the ignition plug, and
   a restriction unit is formed in the auxiliary chamber gas supply path, and an amount of fuel gas supplied to the auxiliary chamber per unit time is configured to be reduced by setting the opened period of the solenoid valve required for supplying a predetermined amount of fuel gas to the auxiliary chamber to be longer than in a case where the restriction unit is not formed in the auxiliary chamber gas supply path,
   wherein the restriction unit is an orifice formed in the auxiliary chamber gas supply path and the orifice disposed in the auxiliary chamber gas supply path, and a flow coefficient of the orifice is in a range between 0.05 and 0.3.

3. A method for suppressing dispersion among a plurality of auxiliary chamber gas supply devices for a gas engine, comprising a step of:
   providing a plurality of auxiliary chamber gas supply devices for a gas engine including,
     a main chamber defined between a piston and a cylinder head,
     an auxiliary chamber in communication with the main chamber through an injection hole,
     an auxiliary chamber gas supply path through which fuel gas is configured to be supplied to the auxiliary chamber, and
     an ignition plug disposed to face the auxiliary chamber, wherein
     the auxiliary chamber gas supply path is connected to a fuel gas supply source through a solenoid valve, and
     when the solenoid valve is opened, the fuel gas, in an amount corresponding to an opened period of the solenoid valve, is configured to be supplied from the fuel gas supply source to the auxiliary chamber through the auxiliary chamber gas supply path and the fuel gas supplied to the auxiliary chamber is configured to be ignited by the ignition plug;
   forming a restriction unit in the auxiliary chamber gas supply path; and
   reducing an amount of fuel gas supplied to the auxiliary chamber per unit time by setting the opened period of the solenoid valve required for supplying a predetermined amount of fuel gas to the auxiliary chamber to be longer than in a case where the restriction unit is not formed in the auxiliary chamber gas supply path;
   whereby the dispersion in the supplied amount of the fuel gas is configured to be suppressed, among the plurality of auxiliary gas supply devices for the gas engine,
   wherein the restriction unit is a check valve disposed in the auxiliary chamber gas supply path, and a flow coefficient of the check valve is in a range between 0.05 and 0.3.

4. The auxiliary chamber gas supply device for the gas engine according to claim 1,
   wherein the solenoid valve is configured to control not valve opening position but the opened period of the solenoid valve so as to adjust the amount of the fuel gas supplied to the auxiliary chamber.

5. The method for suppressing dispersion among a plurality of auxiliary chamber gas supply devices for the gas engine according to claim 3,
    wherein the solenoid valve is configured to control not valve opening position but the opened period of the solenoid valve so as to adjust the amount of the fuel gas supplied to the auxiliary chamber.

\* \* \* \* \*